United States Patent Office 3,808,130
Patented Apr. 30, 1974

3,808,130
SELF-LUBRICATING BEARINGS AND OTHER MACHINE ELEMENTS AND A PROCESS FOR THEIR MANUFACTURE
Harry M. Schiefer, Krailing, Raymund W. Laux, Munich-Karlsfeld, and Dietmar W. Grosse, Munich, Germany, assignors to Dow Corning Corporation, Midland, Mich.
No Drawing. Filed June 19, 1972, Ser. No. 264,124
Int. Cl. C10m 7/28, 7/06, 7/04
U.S. Cl. 252—12.4                 19 Claims

ABSTRACT OF THE DISCLOSURE

Self-lubricating bearings and other machine elements are prepared by admixing perfluoroalkylene polymers such as polytetrafluoroethylene with defined inorganic solid lubricants and epoxy resins followed by a cold molding technique and heating cycle which allows the economical production of large numbers of self-lubricating parts with excellent precision and low dimensional change.

---

Machine elements subject to mutual relative motion are usually lubricated by a lubricant introduced between these parts. However, modern developments are aimed at using self-lubricating machine elements.

It is known that self-lubricating machine elements can be produced by using so-called lubricant coatings containing solid lubricants such as zinc sulphide, calcium fluoride, polytetrafluoroethylene and, in particular, molybdenum disulphide. Synthetic resins such as epoxy resins and polyvinyl butyrals dissolved in solvents are used as the binder for the solid lubricants. These preparations are applied to the articles and, after drying or by the action of heat, yield thin dry lubricant films. The disadvantage is that such films possess relatively short useful lives.

It is further known that sliding machine elements can be entirely produced from low-friction materials. Thus machine elements have already been fabricated from polyamides with added molybdenum disulphide. The addition of molybdenum disulphide is aimed at improving the suitability of these plastics as a low-friction material. While such an addition does indeed increase the degree of crystallinity of the polyamide and hence leads to enhanced mechanical strength and reduced water absorption, the wear properties are not improved adequately, because the plastic does not withstand the loads at which the lubricating properties of the molybdenum disulphide become fully effective.

Further, self-lubricating bearings made of polytetrafluoroethylene are known which are suitable for low loads and low sliding speeds. The disadvantage here is their inadequate hardness and cold flow under load, leading to bearing failure. It has, therefore, been proposed to improve the properties of the polytetrafluoroethylene by using low friction materials with polytetrafluoroethylene along with admixed graphite, molybdenum disulphide, glass fiber and metal powder; these can be used under somewhat higher loads and at higher sliding speeds but their wear often is still too high.

It is known, further, to produce self-lubricating bearings from compositions consisting of polytetrafluoroethylene, molybdenum disulphide and other solid lubricants, metal powder and liquid epoxy resin, by pouring into molds and subsequently curing. The disadvantage is that, because of their formulation, such compositions need to be processed by casting and therefore do not allow convenient nor economical manufacture of a large number of elements. To achieve this, fabrication by cold molding would be required, but this is not possible with liquid compositions. In addition, casting does not lead to bearings meeting the required tolerances and the products need to be brought to the required dimensions by an expensive finishing operation.

Other known bearing compositions with a self-lubricating action are composite substances of mosaic structure which are used in the form of thin strips and which contain rigid lubricant particles with an average particle size greater than 0.075 mm. dispersed in a flexible matrix composition consisting preferably of organopolysiloxane elastomers, ethylene-propylene-diene terpolymers, elastic perfluoropropylene-vinylidene fluoride copolymers or 2-chloro-1,3-butadiene polymers. The rigid particles having a lubricating action consist of a rigid binder, for example, a cured epoxy resin in which solid lubricants are dispersed. These products are readily usable in the form of thin strips. However, such composite bodies are not suitable for fabricating self-lubricating bearings in the form usually required in machine construction, and hence high tooling costs hinder their economical mass production.

Because of the above noted disadvantages in cold molded bearings, sintered metal bearings are used very extensively today. These consist of porous metal bodies whose pores contain lubricating oil. Their disadvantage is that the amount of oil available for lubrication is limited. In addition, oil is thrown off when the shaft rotates at high speed, oil leaks away from vertically positioned bearings and rapid aging of the oil occurs at elevated temperatures. Such bearings cannot be employed under vacuum and at low temperatures, and under high loads and at low sliding speeds since the load bearing capacity of the oil is inadequate and leads to metal-metal contact, a high degree of wear and even seizing.

In contrast to known processes for producing self-lubricating machine elements, the cold molding process described herein offers the advantages that it facilitates an economical production of large numbers of self-lubricating molded parts which show only minor wear at high stresses and, at high and low temperatures they have excellent hardness and strength as well as low friction coefficients, they are maintenance free during long periods of use and further, they are useful in systems where vacuum is required.

Thus, one object of this invention is a process for manufacturing molded objects made of self-lubricating lubricant material by mixing a powdery heat-curable epoxy resin solid at 20° C. containing preferably curing agent and/or cross-linking catalysts with powdery inorganic solids, especially solid lubricants, homogenizing and pulverizing the mixture into a powder, mixing the powder with polytetrafluoroethylene, cold molding into molded objects and curing the molded objects at increased temperatures, characterized by the fact that the epoxide resin and the inorganic solid material are mixed in a ratio of 10 to 25 parts by weight of epoxide resin and 90 to 75 parts by weight of inorganic solids, plasticized and homogenizing the mixture at a processing temperature above the softening point of the epoxide resin, producing a powdery mixture using pulverization and screening, this mixture having a particle size in which more than 80 weight percent of the particles is less than 0.315 mm. in size, mixing the powder mixture with 2 to 30 weight percent polytetrafluoroethylene, based on the total weight of all three components and molding at room temperature at a molding pressure of 15–50 kp./mm.² which stands in a specific ratio to the amount of polytetrafluoroethylene used, and subsequently curing the molded objects at increased temperatures up to 260° C. through a specific cycle.

In a surprising manner it has now been found that the deviation of the molded objects from the theoretical dimension can be decreased to measurements which are practically incapable of being measured, that the amount of one of the three components of the molding mixture, namely perfluoroalkylene polymers and the applied molding pressure balance one another out. As will be explained in greater detail, within specific limits for the amount of perfluoroalkylene polymers and molding pressure, the desired tolerance accuracy will be achieved with a decreased addition of perfluoroalkylene polymer in combination with a higher pressure or with a higher addition of perfluoroalkylene polymer in combination with a decreased molding pressure.

Cold molding masses from which the low tolerance, self-lubricating formed articles are produced, according to the invention, consist of three components.

The first component is a powdered epoxide resin, heat curable and solid at room temperature which contains preferably a curing agent or cross-linking catalyst. The epoxy resin used for purposes according to the invention must be a solid material under normal conditions since liquid epoxy resins are not suitable for processing using cold molding. Epichlorohydrin-bisphenol A condensates i.e., novolac resins (bisphenol A is 2,2-bis(4-hydroxyphenyl)-propane) with multi-epoxy functionality or cycloaliphatic epoxy resins which have epoxide equivalent weights in the range of 200 to 1000 are quite suitable. Curing agents and crosslinking catalysts can be for example, polycarboxylic acids, which are solids at room temperature, and their anhydrides, as well as amines and amides in the powdered form. The resins employed herein are well known and are fully described in Polymers and Resins by Golding, published by D. Van Nostrand Co., Inc., 1959, Library of Congress catalogue Card No. 59–8412.

The molding masses processed according to the process of the invention contain a second component, which is an inorganic solid material. The inorganic solid materials used for purposes of the invention consist of at least one and preferably two solid lubricants. In addition to solid lubricants the second component may also have reinforcing and non-reinforcing filler material. Inorganic solid materials suitable for the invention are metallic sulfides, especially $MoS_2$, $WS_2$ and $ZnS$, metallic oxides, for example $ZnO$, $PbO$ and $Ca(HO)_2$, metal fluorides, for example $CaF_2$, $Na_3AlF_6$ and $FeF_2$, graphite, boron nitride, barium sulfate, fiberglass, asbestos or other silicates with a fibrous structure and carbon in the form of fibers. It is preferred not to employ as inorganic solid materials, alkali metal sulphides, alkaline earth metal sulphides or alkali metal oxides as they do not give optimum properties.

As a third component for this process, polyperfluoroalkylene polymers are used which have a molecular weight of 35,000 grams/mole to 100,000 grams/mole.

Preferably, polytetrafluoroethylene (PTFE) wax is used but it is within the scope of this invention to use higher molecular weight perfluoroalkylene polymers having molecular weights of up to 150,000 grams/mole and which, when used, have an average particle size of less than 0.075 mm.

The PTFE wax of this invention is a thermally degradable material with a molecular weight of 35,000 to 100,000 grams/mole, an average particle size of 0.03 mm., a density of 2.25 to 2.27 and a melting point range of 324 to 327° C. Such materials are commercially available.

It is also within the scope of this invention to utilize polytetrafluoroethylene - perfluoropropylene copolymers having a molecular weight of less than 150,000 grams/mole.

It is a further object of this invention to utilize a composition for molding self-lubricating elements consisting essentially of (a) 10–25 percent by weight of a solid thermosetting epoxy resin selected from a group consisting of condensates of epichlorohydrin and 2,2-bis(4-hydroxyphenyl) propane or epichlorohydrin and a cycloaliphatic epoxy resin;

(b) 90–75 percent by weight of inorganic solid particles with an average particle size of less than 0.075 mm. selected from the group consisting of metal sulphides, metal oxides, metal fluorides, graphite, boron nitride, barium sulphate, glass fibers, asbestos, silicates with a fibrous structure or carbon in fibrous form, and (c) 2–30 percent by weight of solid perfluoroalkylene polymers or copolymers with a molecular weight of 35,000 to 150,000 grams/mole.

The process according to the invention is conducted in essentially five (5) major stages:

(1) The inorganic solid particles and the epoxy resin which contains a curing agent or crosslinking catalyst is made a homogeneous powdery mixture by any known method.

(2) The mixture is plasticized and homogenized in an extruder, preferably in a planetary rolling extruder, or a double roll mill at a processing temperature above the softening temperature of the epoxy resin. When using a roll mill the one roll is correspondingly heated, the other may be cooled.

(3) The resulting material which may be in the form of coarse lumps or boards is reduced to a powder. Then by means of screening a sieve fraction is produced with a particle size distribution consisting of at least 80 weight percent particles with a particle size of less than 0.315 mm.

The sieve fraction is intimately mixed with 2 to 30 weight percent of polyperfluoroalkylene based on the total weight of all three components.

(4) The molding mixture obtained in this way is molded with the known steel multi-cavity dies with a predetermined molding pressure based on the added polytetrafluoroethylene, of 15 to 50 kp./mm.$^2$ at room temperature to form molded objects. Using the process according to the invention up to 2000 self-lubricating, low tolerance molded objects, especially slide bearings can be produced per hour.

(5) The cold molded objects are cured finally in a heating oven at increased temperatures up to 260° C. Preferably a heating cycle of 2 hours is used at 170° C., 2 hours at 200° C. and 4 hours at 230° C.

It is essential in the invention that in order to achieve as little shrinkage or swelling as possible, the required molding pressure and portion of molding mixture of polytetrafluoroethylene will have to balance one another out and the inorganic solid material and epoxy resins which are used and their ratio will have to be balanced out as will be evident from the following examples in which the invention is explained in greater detail. The process is conducted as indicated above, in 6 hours. The molded objects produced are cured for 2 hours at 170° C., 2 hours at 200° C., and finally for 4 hours at 230° C.

In accordance with the invention, cured molded products with excellent mechanical properties are obtained. In addition, bearing components suitable for use with heavy loads can be produced without metal backings, because the exceptionally low friction values prevent the accumlation of heat.

The invention will now be described in greater detail by way of the following examples which are not to be considered as limiting the scope of this application.

EXAMPLE 1

38 parts by weight molybdenum sulphide, 38 parts by weight zinc sulphide, 15.9 parts by weight epichlorohydrin-bisphenol A epoxy resin and an epoxy equivalent weight of 475 to 575 and 3.1 parts by weight of 1,2,3,4-cyclopentanetetracarboxylic acid dianhydride were admixed with one another, homogenized on the two-roll mill and ground to fine powder. 5 parts by weight polytetrafluoroethylene with a loose bulk density of 600 to 800 g./l., an average particle size of 0.030 mm., a specific gravity of 2.25 to 2.29, a melting range of 324 to 327° C. and a molecular weight of 35,000 to 100,000 grams/ mole are then admixed. The powder mixture is processed further as described above. Measured according to DIN 53,456, the ball indentation hardness of the cured material is 22.9 kp./mm.².

EXAMPLE 2

To demonstrate the superiority of the molded bodies made from self-lubricating low friction material, bearings produced by this invention using a molding composition consisting of 40 parts by weight of molybdenum disulphide, 40 parts by weight of zinc sulphide, 16.7 parts by weight of the epoxy resin described in Example 1 and 3.3 parts by weight of 1,2,3,4-cyclopentanetetracarboxylic acid dianhydride (designated "A" in the table below) is compared, with respect to the coefficient of friction and the rate of wear, with bearings produced from the molding compositions described in Example 1. The coefficient of friction is determined with the A. A. Bartel lubrimeter at a PV of $$\frac{7.5 \text{ k.pf.}}{\text{cm.}^2} \times \frac{\text{m.}}{\text{sec.}}$$

The rate of wear is determined on small electric motors simulating practical conditions. The motors are allowed to run for 1000 hours. After this period the change in the inner diameter due to wear of the bearing produced from the self-lubricating low friction material is measured and the rate of wear is calculated as the number of operating hours producing wear of 0.001 mm. Two different motors are used for the test. Motor 1 is operaed at 1500 r.p.m., a speed of 0.63 m./sec. and a load of 0.28 kp./cm.², motor at 1500 r.p.m., a speed of 0.32 m./sec. and a load of 0.15 kp./cm.². The results are shown in the following table.

| Sample | Coefficient of friction | Rate of wear in hours Motor 1 | Motor 2 |
|---|---|---|---|
| Example 1 | 0.093 | 11.4 | 8.2 |
| A | 0.110 | 2.8 | 4.2 |

In Examples 3 and 5 small round rods are produced with a diameter of 10 mm. and a length of 15 mm. in which the tolerance precision of the external diameter is significant and in Example 4 calotte bearings are produced with an internal diameter of 4 mm. Where it is a question of the tolerance precision of the internal diameter, greater demands are placed on the dimensional stability of the internal diameter of the calotte bearing than on the external diameter of round bars and even a dimensional change during curing of 2 parts per 1,000 is considered unacceptable and a dimensional change of 1 part per 1,000 at most is considered desirable.

To illustrate the influence of the ratio of the molding pressure to the weight of prefluoroalkylene polymers, the following processes were carried out. The results are tabulated in Table I.

EXAMPLE 3

A mixture of 40 parts by weight of molybdenum sulfide and 40 parts by weight of zinc sulfide (component 1) was processed with 16.7 parts by weight of epoxy resin with an average epoxy equivalent of 525 and 3.3 parts by weight cyclopentane tetracarboxylic acid dianhydride (compound 2) according to the process described above, however, with the exclusion of polytetrafluoroethylene as the third component. The molding pressure was 20 kp./mm.². After curing, the dimensional change of the external diameter was —5.3 parts per 1,000. The procedure was repeated using 10 weight percent of PTFE and a pressure of 20 kp./mm.² and the dimensional change was 0.5 parts per 1,000.

When the same comparative experiment was carried out at 35 kp./mm.², and the addition of PTFE was 5.5 parts, the results were 1.8 and 0 (see Table I).

When the molding mixture contained 2 weight percent PTFE, a molding pressure of 40 kp./mm.² was required in order to achieve dimensional stability of 0 while a pressure of only 27 kp./mm.² was needed to cause dimensional stability when the PTFE was present at 8 weight percent.

TABLE I

| Weight percent PTFE: | Pressure, kp./mm.² | Dimensional change/1,000 |
|---|---|---|
| 0 | 20 | 5.3 |
| 10 | 20 | 0.5 |
| 0 | 35 | 1.8 |
| 5.5 | 35 | 0 |
| 2 | 40 | 0 |
| 8 | 27 | 0 |

It is surprising that according to the invention by adding polytetrafluoroethylene as the third component of the molding mixture and by using a molding pressure balanced to its a dimensional stability of the molding object can be strongly decreased during curing. For comparison purposes polytetrafluoroethylene alone was molded into objects in the same way as described for the above molding mixtures and subjected to the same temperature cycle. When using a molding pressure of 20 kp./mm.² a dimensional change of —9.8 parts per 1,000 occurred and at a molding pressure of 35 kp./mm.² a dimensional change of —9.2 parts per 1,000.

The connection between the polytetrafluoroethylene content of the molding mixture and the molding pressure used on the one hand and dimensional change of the diameter during curing on the other hand is to be seen even more clearly in Tables II and III which give the results of previous investigations.

Table II shows a dimensional change of the diameter during curing as a function of the polytetrafluoroethylene content of the molding mixture at a constant molding pressure of 20 kp./mm.² and 35 kp./mm.².

Table II shows a dimensional change of the diameter during curing as a function of the applied molding pressure for molding mixtures with a polytetrafluoroethylene content of 2 weight percent and 8 weight percent as well as for polytetrafluoroethylene wax alone.

TABLE II

| | Percent dimensional change | |
|---|---|---|
| | 20 kp./mm.² | 35 kp./mm.² |
| Percent PTFE: | | |
| 2 | —3.8 | —0.6 |
| 4 | —2.5 | —0.2 |
| 6 | —1.7 | 0.1 |
| 8 | —1.4 | 0.4 |
| 10 | —0.5 | 1.1 |
| 12 | —0.3 | 1.1 |

TABLE III

| | Percent dimensional change | | |
|---|---|---|---|
| | PTFE (mixture) 2 weight percent | PTFE (mixture) 8 weight percent | PTFE alone |
| Kp./mm.² pressure: | | | |
| 15 | —7.0 | —3.0 | |
| 20 | —3.8 | —1.3 | —9.7 |
| 25 | —2.5 | —0.4 | —9.6 |
| 30 | —1.4 | 0.5 | —9.4 |
| 35 | —0.5 | 0.5 | —9.2 |
| 40 | 0 | 1.0 | |
| 45 | 0.1 | 1.4 | |
| 50 | 0.9 | 1.8 | |

It is essential that the above indicated series of the process steps according to the invention be maintained as is shown in the following investigation.

A final material was made in which the starting materials were as in Example 3, except only zinc sulfide was used alone. After the third step of the process, molybdenum sulfide was added (the same amount as in Example 3) and the process was continued.

To one batch of this material, 15 weight percent of PTFE was added, (A) to the second batch no PTFE was added, (B) the compounds were then molded as in Example 3.

In (B), the dimensional change was 5.2 parts/1,000 but there was no shrinkage, there was swelling instead. In (A), the dimensional change was +1.4 parts per 1,000.

EXAMPLE 4

The method of working of Example 1 was repeated with the exception that calotte bearings were produced. At a molding pressure of 35 kp./mm.$^2$ without the addition of polytetrafluoroethylene, a dimensional change of the internal diameter of −2.9 parts per 1,000 was determined. When a molding mixture containing 15% polytetrafluoromethylene wax was used at the same molding pressure the dimensional change of the internal diameter curing dropped back to −0.5 parts per 1,000.

EXAMPLE 5

From various mixtures of inorganic solids and solid epoxy resins with or without curing agent or cross-linking catalysts round bars were produced as in Example 1. The following mixtures were used:

(a)

| | Parts by weight |
|---|---|
| $MoS_2$ | 22.3 |
| ZnS | 22.3 |
| $CaF_2$ | 16.3 |
| Graphite | 16.3 |
| Solid epoxide resin, EEW[1] ca. 525 | 19.0 |
| CPDA[2] | 3.8 |

[1] Epoxy equivalent weight.
[2] Cyclopentanetetracarboxylic acid dianhydride.

(All parts are on a weight basis as in (a) above.)

(b)

| | Parts by weight |
|---|---|
| $MoS_2$ | 28.3 |
| ZnO | 18.9 |
| $CaF_2$ | 17.3 |
| Graphite | 17.3 |
| Solid epoxide resin, EEW ca. 525 | 18.2 |

(c)

| | Parts by weight |
|---|---|
| $MoS_2$ | 6.3 |
| Kryolith | 71.9 |
| Solid epoxide resin, EEW ca. 525 | 18.2 |
| CPDA | 3.6 |

(d)

| | Parts by weight |
|---|---|
| $MoS_2$ | 23.1 |
| ZnS | 23.1 |
| $CaF_2$ | 16.9 |
| Graphite | 16.9 |
| Solid epoxide resin, EEW ca. 525 | 20.0 |

(e)

| | Parts by weight |
|---|---|
| $MoS_2$ | 22.3 |
| ZnS | 22.3 |
| $CaF_2$ | 16.3 |
| Graphite | 16.3 |
| Solid epoxide resin, EEQ ca. 245 | 19.0 |
| Methylene dianilin | 3.8 |

(f)

| | Parts by weight |
|---|---|
| $MoS_2$ | 22.3 |
| ZnS | 22.3 |
| $CaF_2$ | 16.3 |
| Graphite | 16.3 |
| Solid epoxide resin, EEW ca. 600 | 20.3 |
| CPDA | 2.5 |

(g)

| | Parts by weight |
|---|---|
| $MoS_2$ | 22.3 |
| ZnS | 22.3 |
| $CaF_2$ | 16.3 |
| Graphite | 16.3 |
| Solid epoxide resin, EEW ca. 525 | 20.8 |
| Methylene dianilin | 2.0 |

(h)

| | Parts by weight |
|---|---|
| $MoS_2$ | 23.1 |
| ZnS | 23.1 |
| $CaF_2$ | 16.9 |
| Graphite | 16.9 |
| Solid epoxide resin, EEQ ca. 245 | 20.0 |

In all cases a molding pressure of 35 kp./mm.$^2$ was used. By way of a third component thermally degraded polytetrafluoroethylene of the commercial type in powder form was used. The following table shows the dimensional change of the external diameter of the molded object during curing in parts per 1,000 as a function of the content of PTFE in the molding mixtures.

| | Addition of PTFE (in percent) | | | | |
|---|---|---|---|---|---|
| | 0 | 5 | 10 | 15 | 30 |
| Mixture: | | | | | |
| (a) | −3.9 | −2.3 | −1.8 | −0.8 | |
| (b) | −1.9 | −1.3 | +0.2 | | |
| (c) | −6.1 | −5.4 | −4.7 | −3.9 | −1.7 |
| (d) | −2.9 | −2.3 | −1.8 | −0.8 | |
| (e) | −2.6 | −1.1 | +0.3 | | |
| (f) | −2.8 | −1.9 | −1.3 | | |
| (g) | +2.5 | +0.5 | | | |
| (h) | −4.4 | −3.5 | −1.4 | | |

That which is claimed is:

1. Cold molded self-lubricating bearing consisting essentially of
   (a) 10–25 percent by weight of a curing, solid thermosetting epoxy resin consisting of condensates of epichlorohydrin and 2,2-bis(4-hydroxyphenyl)-propane with epoxy equivalents weights of 200 to 1,000,
   (b) 90–75 percent by weight of solid particles with an average particle size of less than 0.075 mm. which are ingoranic solids selected from a group consisting of graphite, boron nitride, barium sulphate, glass fibers, asbestos, $MoS_2$, $WS_2$, ZnS, ZnO, PbO, $Ca(OH)_2$, $CaF_2$, $Na_3AlF_6$ and $FeF_2$, and
   (c) 2–30 percent by weight of solid polytetrafluoroethylene having a molecular weight of 35,000 to 150,000 grams/mole and an average particle size of less than 0.075 mm. the percentages of (a), (b) and (c) being based on the total weight of the three components.

2. The bearing as in claim 1, consisting essentially of
   (a) 10–25 percent by weight of a solid thermosetting condensate of epichlorohydrin and 2,2-bis(4-hydroxyphenyl)propane cross-linked with 1,2,3,4-cyclopentanetetracarboxylic acid dianhydride,
   (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, ZnS, ZnO, PbO, $Ca(OH)_2$, $CaF_2$, $Na_3AlF_6$ and $FeF_2$, and
   (c) 2–3 percent by weight of a solid polytetrafluoroethylene having a molecular weight of 35,000 to 150,-

000 grams/mole and a particle size of less than 0.075 mm.

3. Cold molded self-lubricating bearing consisting essentially of
  (a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
  (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, $ZnS$, $ZnO$, $PbO$, $Ca(OH)_2$, $CaF_2$, $Na_3AlF_6$ and $FeF_2$, and
  (c) 2–30 percent by weight of a solid tetrafluoroethylene-perfluoropropylene copolymer with an average particle size of less than 0.075 mm. and a molecular weight of 35,000 to 150,000 grams/mole, the percentages of (a), (b) and (c) being based on the total weight of the three components.

4. The bearing as in claim 3 consisting essentially of
  (a) 10–25 percent by weight of a solid thermosetting condensate of epichlorohydrin and 2,2-bis(4-hydrophenyl)-propane cross-linked with 1,2,3,4-cyclopentanetetracarboxylic acid dianhydride,
  (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, $ZnS$, $ZnO$, $PbO$, $Ca(OH)_2$, $CaF_2$, $Na_3AlF_6$ and $FeF_2$, and
  (c) 2–30 percent by weight of a solid tetrafluoroethylene-perfluoropropylene copolymer with an average particle size of less than 0.075 mm. and a molecular weight of 35,000 to 150,000 grams/mole, the percentages of (a), (b) and (c) being based on the total weight of the three components.

5. The bearing as in claim 1 consisting essentially of
  (a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
  (b) 90–75 percent by weight of solid particles of equal weights of $MoS_2$ and $ZnS$ and,
  (c) 2–30 percent by weight of solid polytetrafluoroethylene with a molecular weight of 35,000 to 150,000 grams/mole and a particle size of less than 0.075.

6. The bearing as in claim 3 consisting essentially of
  (a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
  (b) 90–75 percent by weight of solid particles of equal weights of $MoS_2$ and $ZnS$, and
  (c) 2–30 percent by weight of a solid tetrafluoroethylene-perfluoropropylene copolymer with an average particle size of less than 0.075 mm. and a molecular weight of 35,000 to 150,000 grams/mole, the percentages of (a), (b) and (c) being based on the total weight of the three components.

7. A composition for producing a cold molded self-lubricating bearing consisting essentially of
  (a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
  (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, $ZnS$, $ZnO$, $PbO$, $Ca(OH)_2$, $CaF_2$, $Na_3AlF_6$ and $FeF_2$, and
  (c) 2–30 percent by weight of solid polytetrafluoroethylene having a molecular weight of 35,000 to 150,000 grams/mole and an average particle size of less than 0.075 mm. the percentages of (a), (b) and (c) being based on the total weight of the three components.

8. The composition as claimed in claim 7 consisting essentially of
  (a) 10–25 percent by weight of a solid thermosetting condensate of epichlorohydrin and 2,2-bis(4-hydroxyphenyl)propane cross-linked with 1,2,3,4-cyclopentanetetracarboxylic acid dianhydride,
  (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, $ZnS$, $ZnO$, $PbO$, $Ca(OH)_2$, $CaF_2$, $Na_3AlF_6$ and $FeF_2$, and
  (c) 2–30 percent by weight of solid polytetrafluoroethylene with a molecular weight of 35,000 to 150,000 grams/mole and a particle size of less than 0.075 mm.

9. A composition for producing a cold molded self-lubricating bearing consisting essentially of
  (a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
  (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, $ZnS$, $ZnO$, $PbO$, $Ca(OH)_2$, $CaF_2$, $Na_3AlF_6$ and $FeF_2$, and
  (c) 2–30 percent by weight of a solid tetrafluoroethylene-perfluoropropylene copolymer with an average particle size of less than 0.075 mm. and a molecular weight of 35,000 to 150,000 grams/mole, the percentages of (a), (b) and (c) being based on the total weight of the three components.

10. The composition as claimed in claim 9 consisting essentially of
  (a) 10–25 percent by weight of a solid thermosetting condensate of epichlorohydrin and 2,2-bis(4-hydroxyphenyl)-propane cross-linked with 1,2,3,4-cyclopentanetetracarboxylic acid dianhydride,
  (b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, $ZnS$, $ZnO$, $PbO$, $Ca(OH)_2$, $CaF_2$, $Na_3AlF_6$ and $FeF_2$, and
  (c) 2–30 percent by weight of a solid tetrafluoroethylene-perfluoropropylene copolymer with an average particle size of less than 0.075 mm. and a molecular weight of 35,000 to 150,000 grams/mole, the percentages of (a), (b) and (c) being based on the total weight of the three components.

11. The composition as claimed in claim 7 consisting essentially of
  (a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
  (b) 90–75 percent by weight of solid particles of equal weights of $MoS_2$ and $ZnS$ and,
  (c) 2–30 percent by weight of solid polytetrafluoroethylene with a molecular weight of 35,000 to 150,000 grams/mole and a particle size of less than 0.075 mm.

12. The composition as claimed in claim 9 consisting essentially of
  (a) 10–25 percent by weight of a curing, solid thermosetting epoxy resin consisting of condensates of epichlorohydrin and 2,2-bis(4-hydroxyphenyl)-propane or condensates of epichlorohydrin and cycloaliphatic epoxy resins with epoxy equivalent weights of 200 to 1,000,
(b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, ZnS, ZnO, PbO, $Ca(OH)_2$, $CaF_2$, $Na_3AlF_6$ and $FeF_2$, and
(c) 2–30 percent by weight of a solid tetrafluoroethylene-perfluoropropylene copolymer with an average particle size of less than 0.075 mm. and a molecular weight of 35,000 to 150,000 grams/mole, the percentages of (a), (b) and (c) being based on the total weight of the three components.

13. A process for manufacturing cold molded self-lubricating bearings wherein the components
(a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
(b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, ZnS, ZnO, PbO, $Ca(OH)_2$, $CaF_2$, $Na_3AlF_6$ and $FeF_2$, are
(1) mixed and made into a powder;
(2) plasticized and homogenized at a temperature above the softening temperature of Component (a);
(3) repowdered and sieved to obtain a fraction with a particle size distribution consisting of at least 80 percent particles with a particle size of less than than 0.315 mm. which are then intimately mixed with 2–30 weight percent of solid polyperfluoroalkylene selected from a group consisting of polytetrafluoroethylene or tetrafluoroethylene-perfluoropropylene copolymer or mixtures thereof having a molecular weight of 35,000 to 150,000 grams/mole and a particle size of less than 0.075 mm., and
(4) molded in a steel multi-cavity die with a predetermined molding pressure of 15–50 kp./mm.$^2$ at room temperature based on the amount of polyperfluoroalkylene added to the mixture, and
(5) heating in an oven at increasing temperatures for specific time periods of 2 hours at 170° C., 2 hours at 200° C. and 4 hours at 230° C. to obtain the final molded product.

14. A process for manufacturing cold molded self-lubricating bearings wherein the components
(a) 10–25 percent by weight of a curing, solid thermosetting epoxy resin consisting of condensates of epichlorohydrin and 2,2-bis(4-hydroxyphenyl)-propane with epoxy equivalent weights of 200 to 1,000,
(b) 90–75 percent by weight of solid particles with an average particle size of less than 0.075 mm. which are inorganic solids selected from a group consisting of graphite, boron nitride, barium sulphate, glass fibers, asbestos, $MoS_2$, $WS_2$, ZnS, ZnO, PbO, $Ca(OH)_2$, $CaF_2$, $Na_3AlF_6$ and $FeF_2$, are
(1) mixed and made into a powder;
(2) plasticized and homogenized at a temperature above the softening temperature of component (a);
(3) repowdered and sieved to obtain a fraction with a particle size distribution consisting of at least 80 weight percent particles with a particle size of less than 0.315 mm. which are then intimately mixed with 2–30 weight percent of polytetrafluoroethylene - polyperfluoropropylene copolymer having a molecular weight of 35,000 to 150,000 grams/mole and a particle size of less than 0.075 mm., and
(4) molded in a steel multi-cavity die with a predetermined molding pressure of 15–50 kp./mm.$^2$ at room temperature based on the amount of polyperfluoroalkylene added to the mixture, and
(5) heating in an oven at increasing temperature for specific time periods of 2 hours at 170° C., 2 hours at 200° C. and 4 hours at 230° C. to obtain the final molded product.

15. A process as in claim 13 wherein component (c) is 2–30 percent by weight of solid polytetrafluoroethylene having a molecular weight of 35,000 to 150,000 gram/mole and particle size of less than 0.075 mm.

16. A process as in claim 13 wherein component (b) is present in 90–75 percent by weight and consists essentially of a 50/50 equal weight mixture of $MoS_2$ and ZnS.

17. A process as in claim 14 wherein the component (a) is 10–25 percent by weight of a solid thermosetting condensate of epichlorohydrin and 2,2-bis(4-hydroxyphenyl)propane cross-linked with 1,2,3,4-cyclopentanetetracarboxylic acid dianhydride.

18. A process as in claim 14 wherein component (b) is present in 90–75 percent by weight and consists essentially of a 50/50 equal weight mixture of $MoS_2$ and ZnS.

19. A process as claimed in claim 13 wherein component (c) is a mixture of polytetrafluoroethylene and polytetrafluoroethylene-perfluoropropylene copolymer.

References Cited
UNITED STATES PATENTS

| | | | |
|---|---|---|---|
| 2,400,091 | 5/1946 | Alfthan | 252—12 |
| 2,956,848 | 10/1960 | St. Clair | 252—12 |
| 3,467,596 | 9/1969 | Hermann | 252—12 |
| 3,553,394 | 1/1971 | Zidlicky | 252—12 |
| 3,445,393 | 5/1969 | Hinds | 252—12 |

DANIEL E. WYMAN, Primary Examiner

I. VAUGHN, Assistant Examiner

U.S. Cl. X.R.

252—12